US010149296B1

United States Patent
Noh et al.

(10) Patent No.: US 10,149,296 B1
(45) Date of Patent: Dec. 4, 2018

(54) SIGNAL FIELD ENCODING AND DECODING

(71) Applicant: NEWRACOM, INC., Irvine, CA (US)

(72) Inventors: Yujin Noh, Irvine, CA (US); Dae Won Lee, Irvine, CA (US); Sungho Moon, Irvine, CA (US)

(73) Assignee: NEWRACOM, INC., Lake Forest, CA (US)

( * ) Notice: Subject to any disclaimer, the term of this patent is extended or adjusted under 35 U.S.C. 154(b) by 288 days.

(21) Appl. No.: 15/011,152

(22) Filed: Jan. 29, 2016

Related U.S. Application Data

(60) Provisional application No. 62/111,555, filed on Feb. 3, 2015.

(51) Int. Cl.
*H04W 28/06* (2009.01)
*H04W 72/04* (2009.01)
*H04L 29/06* (2006.01)
*H04L 1/00* (2006.01)

(52) U.S. Cl.
CPC ....... *H04W 72/0453* (2013.01); *H04L 1/0076* (2013.01); *H04L 69/22* (2013.01); *H04W 28/06* (2013.01)

(58) Field of Classification Search
CPC .... H04W 28/06; H04L 29/0604; H04L 69/04; H04L 29/0653; H04L 69/22
See application file for complete search history.

(56) References Cited

U.S. PATENT DOCUMENTS

2013/0235773 A1* 9/2013 Wang ................ H04W 52/0206
                                                                 370/311
2016/0204915 A1* 7/2016 Chen ..................... H04L 1/0061
                                                                 370/329

OTHER PUBLICATIONS

Salomon et al., Handbook of Data Compression, Jan. 18, 2010, Springer, 5th Ed., p. 200-201 (44 pages included).*
"Part 11: Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.
"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™-2013, 2013, pp. 1-395, IEEE (The Institute of Electrical and Electronic Engineers, Inc.), New York, NY, USA.

(Continued)

*Primary Examiner* — Hoon J Chung

(57) ABSTRACT

A method for generating a compressed field addressed to a receiving device comprises generating, using a generator function, a checksum of a field. The field includes an address field and a remaining portion. The method further comprises generating a combined field by combining the checksum with the address field, and generating a compressed field including the combined field and the remaining portion. A method for determining whether the compressed field is addressed to the receiving device comprises receiving the compressed field and determining, using the combined field of the compressed field, an address of the receiving device, and the generator function, whether the compressed field is addressed to the receiving device.

6 Claims, 6 Drawing Sheets

(56) References Cited

OTHER PUBLICATIONS

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

"Part 11: Wireless LAN Medium Access Control (MAC) and Physical Layer (PHY) Specification, Amendment 2: MAC Enhancements for Robust Audio Video Streaming", IEEE Standards 802.11aa™-2012, May 29, 2012, pp. 1-146, IEEE (Institute of Electrical and Electronic Engineers, Inc.), New York, NY, USA.

"Part 11: Wireless LAN Medium Access Control (MAC) and Physical Layer (PHY) Specifications, Amendment 3: Enhancements for Very High Throughput in the 60 GHz Band", IEEE Standards 802.11ad™-2012, Dec. 28, 2012, pp. 1-598, IEEE (The Institute of Electrical and Electronic Engineers, Inc.), New York, NY, USA.

"Part 11: Wreless LAN Medium Access Control (MAC) and Physical Layer (PHY) Specification, Amendment 1: Prioritization of Management Frames", IEEE Standards 802.11™-2012, Apr. 6, 2012, pp. 1-38, IEEE (The Institute of Electrical and Electronic Engineers, Inc.), New York, NY, USA.

"Part 11: Wireless LAN Medium Access Control (MAC) and Physical Layer (PHY) Specification, Amendment 5: Television White Spaces (TVWS) Operation", IEEE Standards 802.11af™-2013, Dec. 11, 2013, pp. 1-176, IEEE (The Institute of Electrical and Electronic Engineers, Inc.), New York, NY, USA.

Fang, et al., "Wireless LANs, Specification Framework for TGai", IEEE Standards P802.11TGai™-2012, Nov. 2012, pp. 1-13, IEEE (The Institute of Electrical and Electronic Engineers, Inc.).

\* cited by examiner

| | Case 1 | | Case 2 | | Case 3 | | Case 4 | |
|---|---|---|---|---|---|---|---|---|
| (Partial) AID | 9/11/16 bits | (Partial) AID | 9/11/16 bits | (Partial) AID | 9/11/16 bits | (Partial) AID | 9/11/16 bits |
| MCS | 4 bits | MCS | 4 bits | MCS | 4 bits | MCS | 4 bits |
| Tail | 6 bits | $N_{STS}$ | 3 bits | ... | | ... | |
| CRC | 8 bits | CRC | 8 bits | CRC | 8 bits | ... | |
| etc | n bits | etc | n bits | etc | n bits | etc | n bits |

| (Partial) AID combined with CRC | 9 bits/11 bits/16 bits |
|---|---|
| MCS | 4 bits |
| Tail | 6 bits |
| etc | n bits |

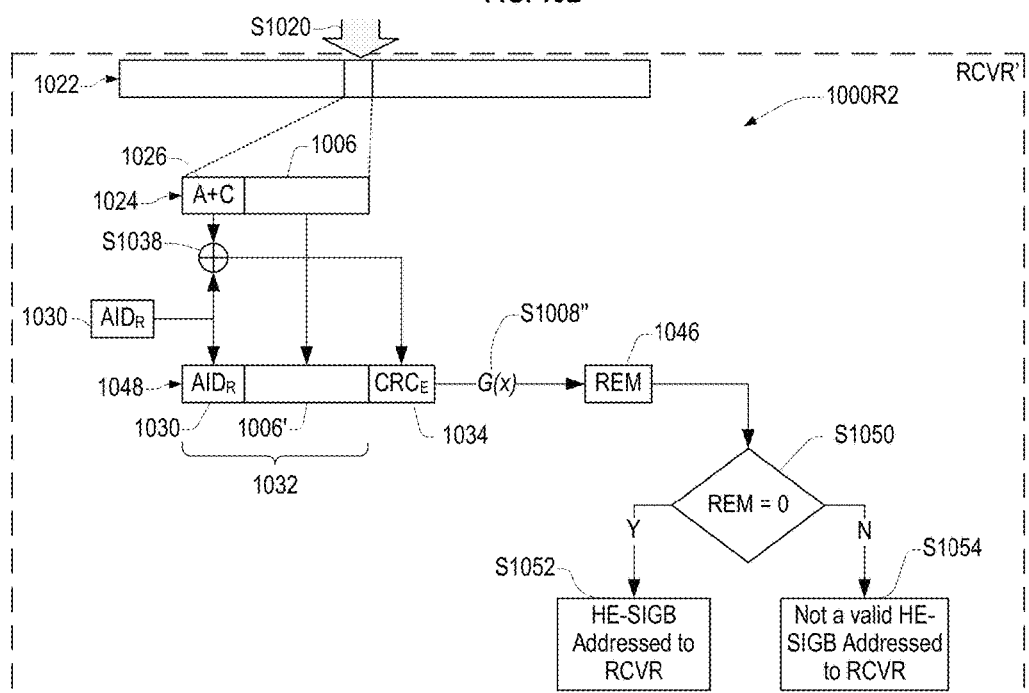

SIGNAL FIELD ENCODING AND DECODING

CROSS-REFERENCE TO RELATED APPLICATION

This application claims the benefit of U.S. Provisional Application No. 62/111,555, filed on Feb. 3, 2015, the contents of which are incorporated herein by reference.

BACKGROUND

1. Technical Field

The technology described herein relates generally to wireless networking. More particularly, the technology relates to encoding and decoding sub-channel allocation information of an Orthogonal Frequency Division Multiple Access (OFDMA) frame used in a wireless network.

2. Description of the Related Art

Wireless LAN (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (hereinafter, IEEE Std 802.11). The IEEE Std 802.11 was subsequently amended by IEEE Std 802.11ae™-2012, IEEE Std 802.11aa™-2012, IEEE Std 802.11ad™-2012, and IEEE Std 802.11ac™-2013 (hereinafter, IEEE 802.11ac).

Recently, an amendment focused on providing a high efficiency WLAN in high-density scenarios is being developed by the IEEE 802.11ax task group. The 802.11ax amendment focuses on improving metrics that reflect user experience, such as average per station throughput, the 5th percentile of per station throughput of a group of stations, and area throughput. Improvements will be made to support environments such as wireless corporate offices, outdoor hotspots, dense residential apartments, and stadiums.

The 802.11ax amendment may introduce Orthogonal Frequency Division Multiple Access (OFDMA) communications into the 802.11 standard. OFDMA communications allow simultaneous communications by a plurality of devices, with each device communicating using one or more sub-channels allocated to the device.

For example, a frame sent using OFDMA from an Access Point (AP) (a Down-Link (DL) OFDMA frame) may include data intended for one or more stations, the data for each station being respectively communicated using one or more subcarriers (that is, frequencies within the bandwidth of the frame) allocated to only that station. A frame received by the AP using OFDMA (an Up-Link (UL) OFDMA frame) may include data from one or more stations, the data from each station being respectively communicated using one or more subcarriers allocated to only that station.

The AP may allocate sub-channels to the stations and communicate the sub-channel allocation information to the stations. The sub-channel allocation information may be communicated in a Signal (SIG) field of the frame, such as a High-Efficiency (HE) SIG-A or SIG-B field of the proposed 802.11ax amendment.

The communication of the sub-channel allocation information adds overhead to the communications of the WLAN, and the additional overhead reduces the amount of user data that may be carried by the WLAN between the AP and the stations. Also, the amount of time, amount of processing resources, or both required for a receiving station to decode the sub-channel allocation information may increase a cost or a power consumption of the receiving station.

SUMMARY

In an embodiment, a method comprised generating, using a generator function, a checksum of a field. The field including an address field and a remaining portion. The method further comprises generating a combined field by combining the checksum with the address field, and generating a compressed field including the combined field and the remaining portion.

In an embodiment, combining the checksum with the address field comprises performing a bit-wise exclusive-or operation using the checksum and the address field.

In an embodiment, the generator function is a Cyclic Redundancy Check (CRC) generator function.

In an embodiment, the compressed field is a High Efficiency Signal B (HE-SIGB) field, and the HE-SIGB field includes information indicating a mapping of a sub-channel of a payload to a receiving device.

In an embodiment, the address field is an Association Identifier (AID) field or a partial AID field, and the value of the address field corresponds to an AID or partial AID of a station of a wireless network.

In an embodiment, a method comprises receiving, by a receiving device, a compressed field. The compressed field includes a combined field and a remaining portion. The combined field has been generated by combining a destination address and a first checksum. The first checksum has been generated by applying a generator function to the destination address and the remaining portion. The method further comprises determining, using the combined field, an address of the receiving device, and the generator function, whether the compressed field is addressed to the receiving device.

In an embodiment, the generator function is a Cyclic Redundancy Check (CRC) generator function.

In an embodiment, determining whether the compressed field is addressed to the receiving device comprises (i) generating, by applying the generator function to the compressed field, a second checksum, (ii) generating, using the second checksum and the combined field, an estimated address, and (iii) comparing the address of the receiving device to the estimated address.

In an embodiment, generating the estimated address comprises performing a bit-wise exclusive-or operation using the combined field and the second checksum.

In an embodiment, determining whether the compressed field is addressed to the receiving device comprises (i) generating, by performing a bit-wise exclusive-or operation using the combined field and the address of the receiving device, an estimated checksum, (ii) generating a codeword including the address of the receiving device, the remaining portion, and the estimated checksum, (iii) generating, by applying the generator function to the codeword, a remainder, and (iv) comparing the remainder to zero.

In an embodiment, the compressed field is a High Efficiency Signal B (HE-SIGB) field, and the HE-SIGB field includes information indicating a mapping of a sub-channel of a payload to a receiving device.

In an embodiment, the address of the receiving device is an Association Identifier (AID) field or a partial AID corresponding to the receiving device in a wireless network.

In an embodiment, an apparatus comprises a transmitting device. The transmitting device is configured to (i) generate a field, the field including a destination address and a remaining part, (ii) generate, using a generator function, a checksum of the field, (iii) generate a combined field by combining the checksum and the destination address, (iv) generate a compressed field including the combined field and the remaining part, and (v) transmit the compressed field.

In an embodiment, the transmitting device is configured to generate the combined field by performing a bit-wise exclusive-or using the checksum and the destination address.

In an embodiment, the generator function is a Cyclic Redundancy Check (CRC) generator function.

In an embodiment, an apparatus comprises a receiving device. The receiving device is configured to receive a compressed field. The compressed field includes a combined field and a remaining portion. The combined field has been generated by combining a destination address and a first checksum. The first checksum has been generated by applying a generator function to the destination address and the remaining portion. The receiving device is further configured to determine, using the combined field, an address of the apparatus, and the generator function, whether the compressed field is addressed to the apparatus.

In an embodiment, the generator function is a Cyclic Redundancy Check (CRC) generator function.

In an embodiment, the receiving device is configured to determine whether the compressed field is addressed to the receiving device by (i) generating, by applying the generator function to the compressed field, a second checksum, (ii) generating, using the second checksum and the combined field, an estimated address, and (iii) comparing the address of the apparatus to the estimated address.

In an embodiment, generating the estimated address comprises performing a bit-wise exclusive-or operation using the combined field and the second checksum.

In an embodiment, the receiving device is configured to determine whether the destination address corresponds to the address of the apparatus by (i) generating, by performing a bit-wise exclusive-or operation using the combined field and the address of the apparatus, an estimated checksum, (ii) generating a codeword including the address of the apparatus, the remaining portion, and the estimated checksum, (iii) generating, by applying the generator function to the codeword, a remainder; and (iv) comparing the remainder to zero.

BRIEF DESCRIPTION OF THE DRAWINGS

FIG. 10B illustrates a process for decoding a compressed HE-SIGB field, according to another embodiment.

DETAILED DESCRIPTION

Figure 1:
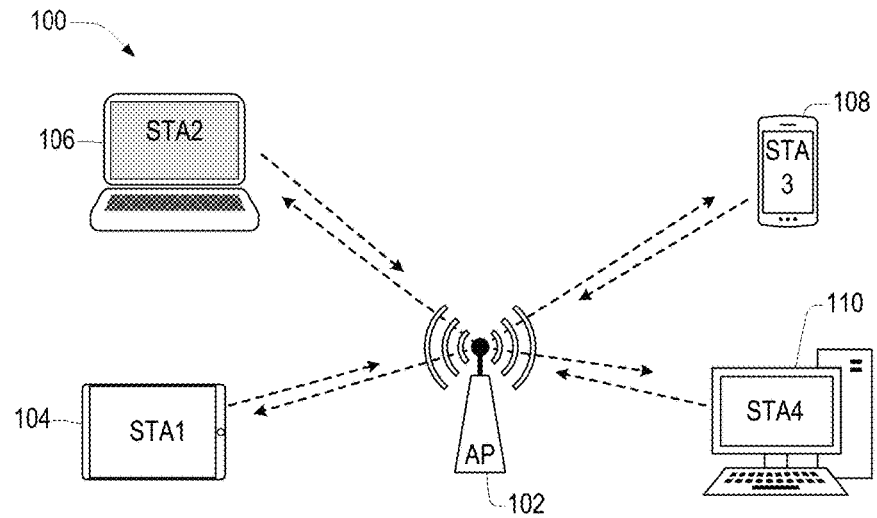
FIG. 1 illustrates a wireless network according to an embodiment.

Embodiments of the present disclosure relate generally to wireless networking, and more particularly, to reducing the resources required to communicate and decode station-specific information of a frame of a wireless network.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

FIG. 1 illustrates a wireless network according to an embodiment. The wireless network includes an infrastructure Basic Service Set (BSS) 100 of a Wireless Local Area Network (WLAN). In an 802.11 wireless LAN, the BSS provides the basic building-block and typically includes an access point (AP) and one or more associated stations (STAs). In FIG. 1, the BSS 100 includes an Access Point 102 (also referred to as AP) wirelessly communicating with first, second, third, and fourth wireless devices (or stations) 104, 106, 108, and 110 (also referred to as STA1, STA2, STA3, and STA4, respectively). The wireless devices may each include a medium access control layer (MAC) and a physical layer (PHY) according to an IEEE 802.11 standard.

Although the example of FIG. 1 shows only the BSS 100 including only the first to fourth stations STA1 to STA4, embodiments are not limited thereto and may comprise BSSs including any number of STAs.

The AP 102 is a station, that is, a STA, configured to control and coordinate functions of the BSS 100. The AP 102 may transmit information to a single station selected from the plurality of stations STA1 to STA4 in the BSS 100 using a single frame. The AP 102 may simultaneously transmit information to two or more of the stations STA1 to STA4 in the BSS 100 using either a single Orthogonal Frequency Division Multiplexing (OFDM) broadcast frame, a single OFDM Multi-User Multi-Input-Multi-Output (MU-MIMO) transmission, or a single Orthogonal Frequency Division Multiple Access (OFDMA) frame.

The stations STA1 to STA4 may each transmit data to the AP 102 using a single frame, or transmit information to and receive information from each other using a single frame. Two or more of the stations STA1 to STA4 may simultaneously transmit data to the AP 102 using an Uplink (UL) OFDMA frame. When the BSS 100 supports Spatial Division Multiple Access (SDMA), two or more of the stations STA1 to STA4 may simultaneously transmit data to the AP 102 using an UL MU-MIMO frame.

In another embodiment, the AP 102 may be absent and the stations STA1 to STA4 may be in an ad-hoc network.

Each of the stations STA1 to STA4 and the AP 102 includes a processor and a transceiver, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium. The transceiver represents a unit functionally connected to the processor, and designed to transmit and receive a frame through the wireless network.

The transceiver may include a single component that performs the functions of transmitting and receiving, or two separate components each performing one of such functions. The processor and the transceiver may be implemented in each of the stations STA1 to STA4 and the AP 102 using respective hardware components, software components, or both.

AP 102 may be or may include a WLAN router, a stand-alone Access Point, a WLAN bridge, a Light-Weight Access Point (LWAP) managed by a WLAN controller, and the like. In addition, a device such as a personal computer, tablet computer, or cellular phone may be able to operate as the AP 102, such as when a cellular phone is configured to operate as a wireless "hot spot."

Each of stations STA1 to STA4 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but is not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

Each frame's type and subtype may be identified using a type field and a subtype field included in a control field of the frame, as prescribed in the applicable standard.

Figure 2:
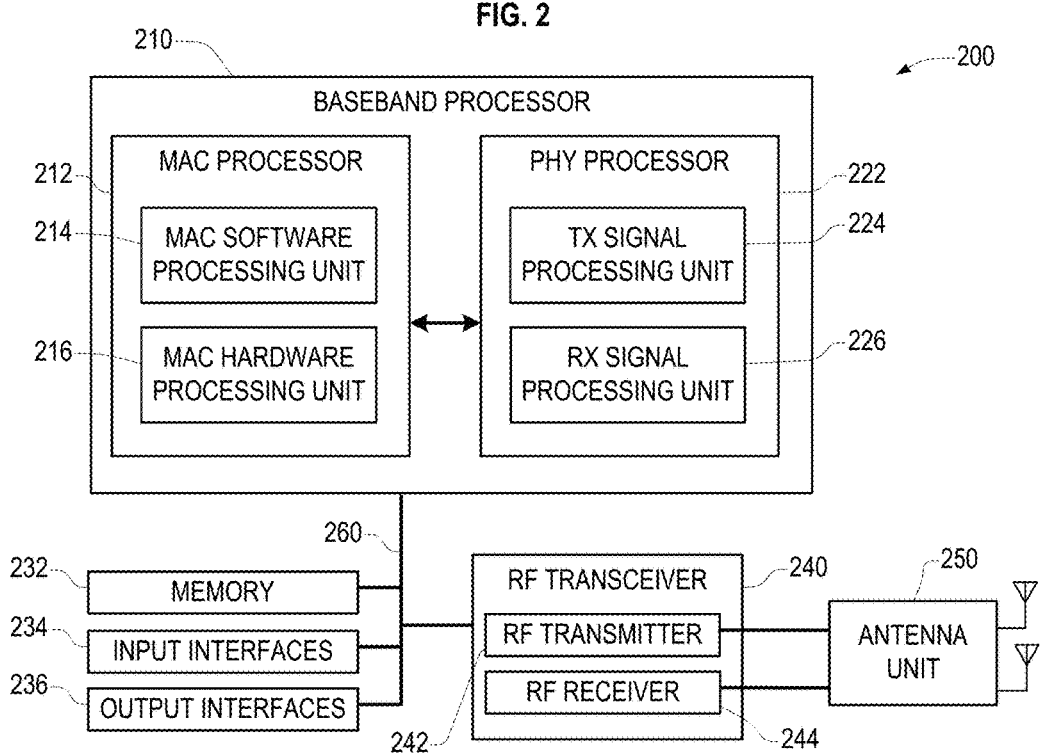
FIG. 2 is a schematic diagram of a wireless device according to an embodiment.

FIG. 2 illustrates a schematic block diagram of a wireless device 200 according to an embodiment. The wireless or WLAN device 200 can represent any device in a BSS, e.g., the AP 102 or any of the stations STA1 to STA4 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222. The baseband processor 210 may utilize the storage device 232, which may include a non-transitory computer readable medium having software (e.g., computer programming instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware, hereinafter referred to as "MAC hardware." However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit 224 and a receiving signal processing unit 226. The PHY processor 222 implements a plurality of functions of the PHY layer. These functions may be performed in software, hardware, or a combination thereof according to implementation.

Functions performed by the transmitting signal processing unit 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like.

The RF transceiver 240 includes an RF transmitter 242 and an RF receiver 244. The RF transceiver 240 is configured to transmit a first information received from the baseband processor 210 to the WLAN, and provide a second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, touch screen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3:
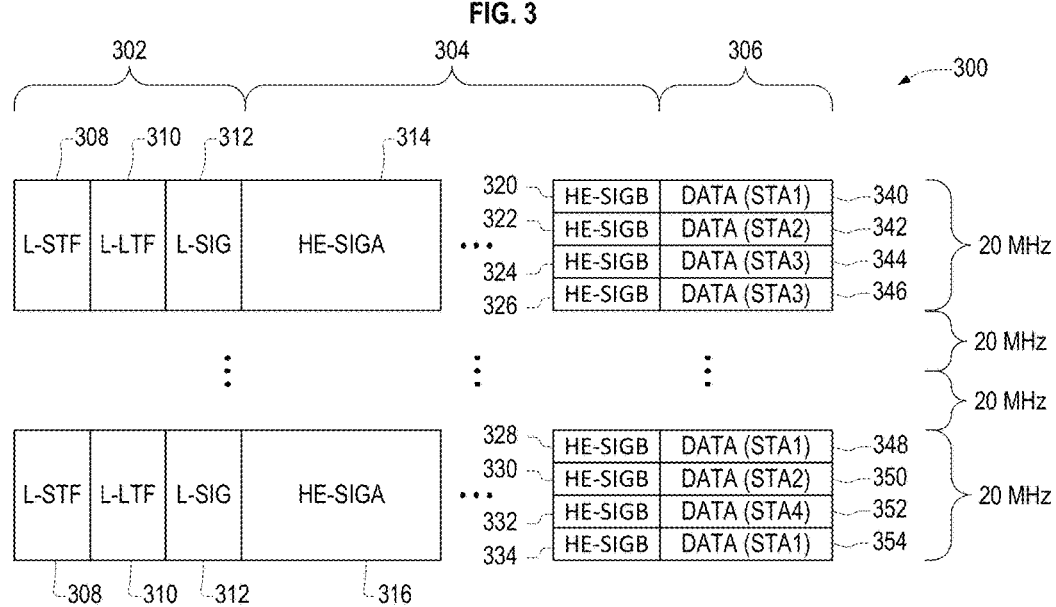
FIG. 3 illustrates an Orthogonal Frequency Division Multiple Access (OFDMA) frame according to an embodiment.

FIG. 3 illustrates an OFDMA frame 300 having an 80 MHz bandwidth according to an embodiment. The OFDMA frame 300 shown includes sub-channels each having a 5 MHz bandwidth, corresponding to 16 sub-channels within an 80 MHZ bandwidth and 32 sub-channels within a 160 MHz. However, embodiments are not limited thereto, and may include any combinations of sub-channel bandwidths and frame bandwidths (for example, 4 sub-channels of 10 MHz over 40 MHz, and so on.)

The OFDMA frame 300 has an 80 MHz bandwidth that includes four 20 MHz channels. The OFDMA frame 300 includes a Legacy Preamble 302, a High Efficiency Header (HE-HDR) 304, and a multi-access data portion 306. In an embodiment, the OFDMA frame 300 is a Down-Link (DL) OFDMA frame.

The Legacy Preamble 302 may include a Legacy Short Training Field (L-STF) 308, a Legacy Long Training Field (L-LTF) 310, and a Legacy Signal Field (L-SIG) 312 that are each transmitted using a 20 MHz BW and that are each duplicated across the entire BW of the OFDMA frame 300.

The HE-HDR 304 may include an HE-SIGA field 314 and one or more of an HE-LTF fields and an HE-STF field (not shown) that are each transmitted using a 20 MHz BW and duplicated across the entire BW of the OFDMA frame 300.

The HE-HDR 304 may further include one or more of HE-SIGB fields, such as first to eighth respective HE-SIGB fields 320 to 334. Each of the HE-SIGB fields 320 to 334 may include information different than the information in at least one other of the HE-SIGB fields 320 to 334. Each of the HE-SIGB fields 320 to 334 may be communicated using respective sub-channels of the OFDMA frame 300.

Although FIG. 3 illustrates four HE-SIGB fields in each 20 MHz channel, corresponding to one HE-SIGB field for each sub-channel of the channel, embodiments are not limited thereto. In an embodiment, each 20 MHz channel may include one HE-SIGB field.

The multi-access data portion 306 includes a plurality of sub-channels within each channel, and one or more of the sub-channels may be assigned to each of the STAs that will participate in the communication using the OFDMA frame 300. In an embodiment, each sub-channel may be assigned to no more than one station. However, one or more sub-channels may be assigned to each station for which data is present in the OFDMA frame 300.

In the example shown in FIG. 3, the OFDMA frame 300 includes data destined for first to fourth STAs STA1 to STA4.

In the primary 20 MHz channel, a first sub-channel 340 is assigned to STA1, a second sub-channel 342 is assigned to STA2, and third and fourth sub-channels 344 and 346 are assigned to STA3. In the fourth 20 MHz channel, fifth and eighth sub-channels 348 and 354 are assigned to STA1, a sixth sub-channel 350 is assigned to STA2, and a seventh sub-channel 352 is assigned to STA4. Allocations of sub-channels to stations in the second and third 20 MHz channels are not shown.

The HE-HDR 304 may include sub-channel allocation information that indicates a mapping of the sub-channels of the multi-access data portion 306 to stations. In an embodiment, the sub-channel allocation information is determined by an AP.

Each station for which the OFDMA frame 300 includes data must be able to detect and determine which subchannels are allocated to communicating data for that station. When the OFDMA frame 300 is a DL OFDMA frame, the OFDMA frame 300 may include the sub-channel allocation information determined by the AP. When the OFDMA frame 300 is an UL OFDMA frame, the sub-channel allocation information may have been communicated from the AP to the stations using a frame sent by the AP prior to the UL OFDMA frame.

In embodiment, the sub-channel allocation information is communicated in the HE-SIGB fields of the OFDMA frame 300. Each of the HE-SIGB fields may include an identifier for the corresponding station, such as an Association Identifier (AID) or a Partial AID (collectively referred to herein as an AID) corresponding to the station to which the associated sub-channel in the multi-access data portion 306 is allocated.

For example, in the example shown in FIG. 3, the first HE-SIGB field 320 would include an AID associated with the first station STA1, indicating that the first sub-channel 340 includes data for the first station STA1. Similarly, the fourth HE-SIGB field 326 includes an AID of a third station STA3 to indicate that the fourth sub-channel 346 includes data for the third station STA3, the fifth HE-SIGB field 328 includes an AID of a first station STA1 to indicate that the fifth sub-channel 348 includes data for the first station STA1, and so on.

In an embodiment, each station receiving the OFDMA frame 300 decodes each of the HE-SIGB fields 320 to 334. The stations determines that a sub-channel of the multi-access data portion 306 is allocated to the station when the station determines that the corresponding HE-SIGB fields 320 to 334 includes an AID associated with the station.

As shown in FIG. 3, the OFDMA frame 300 may include a plurality of HE-SIGB fields each including information for a station for which the OFDMA frame carries a data payload. Furthermore, information for any one station for which the OFDMA frame carries a data payload may be included in one or more HE-SIGB fields.

FIGS. 4-7, below, are described with respect to an OFDMA frame 300 in which a HE-SIGB field is transmitted for each sub-channel. However, embodiments are not limited thereto, and may include any embodiment having an OFDMA frame wherein a plurality of HE-SIGB fields are present and in which a device receiving the OFDMA frame does not know in advance which one or more HE-SIGB fields includes information for the device.

Figure 4:
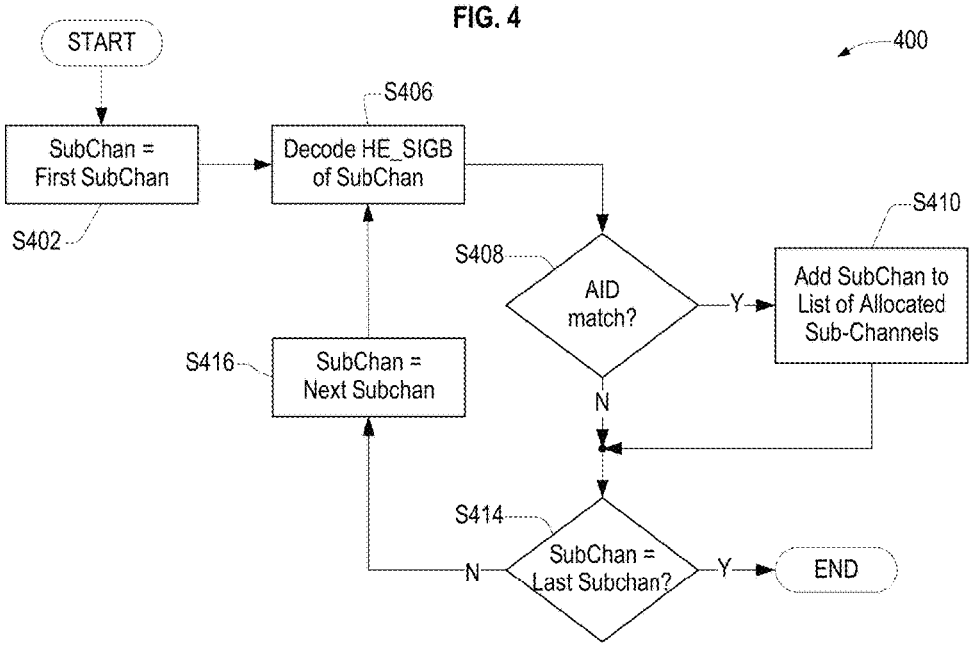
FIG. 4 is a flowchart of a process for decoding sub-channel allocation information included in an OFDMA frame, according to an embodiment.

FIG. 4 is a flowchart of a process 400 for decoding sub-channel allocation information included in an OFDMA frame, according to an embodiment. The process 400 may be performed by a receiving device, such as a station (STA) of a WLAN.

The STA performing the process 400 does not know in advance which HE-SIGB channels include information for the STA because the STA does not know in advance how many and which sub-channels are allocated to the STA. As a result, the STA may decode every HE-SIGB in the OFDMA frame in order to extract an identifier for the STA, such as a (partial) Association Identifier (AID) included in the HE-SIGB field. If the AID included in a HE-SIGB field corresponds to an AID of the STA, the HE-SIGB field includes information for the STA. This decoding of every HE-SIGB field by the process 400 may be referred to as blind decoding.

At S402, the process 400 initializes a sub-channel index SubChan to a first sub-channel of an OFDMA frame. The first sub-channel may be, for example, a sub-channel having a lowest frequency within the OFDMA frame, but embodiments are not limited thereto.

At S406, the process 400 decodes the HE-SIGB field of the sub-channel indicated by the sub-channel index SubChan.

At S408, the process 400 compares the AID of the decoded HE-SIGB field to the AID of the STA performing the process 400. When the AID of the HE-SIGB field corresponds to the AID of the STA, the process 400 proceeds to S410. Otherwise, the process 400 proceeds to S414.

At S410, the process 400 adds the sub-channel indicated by the sub-channel index SubChan to a list of sub-channels allocated to the STA.

At S414, the process 400 checks whether the sub-channel index SubChan is indicating the last sub-channel of the OFDMA frame. The last sub-channel may be, for example, a sub-channel having a highest frequency within the OFDMA frame, but embodiments are not limited thereto.

When the sub-channel index SubChan indicates the last sub-channel, the process 400 ends. Otherwise the process 400 proceeds to S416.

At S416, the sub-channel index SubChan is updated to refer to the next sub-channel of the OFDMA frame. The next sub-channel may be, for example, a sub-channel adjacent to and having a higher frequency than the sub-channel indicated by the sub-channel index SubChan, but embodiments are not limited thereto. The process 400 then proceeds to S406.

Equation 1 computes the bit rate required to blind decode all of the HE-SIGB fields in an OFDMA frame and demonstrates that it is practical for a device to blind-decode every HE-SIGB field assuming maximum 32 (indicated as $N_T$) 5-MHz-sub-channels spread over 160 MHz operating bandwidth. Equation 1 assumes the HE-SIGB fields are transmitted in a 12.8 microsecond (µs) interval (indicated in Equation 1 by I) excluding CP, that each HE-SIGB field has 26 bits (indicated by $N_B$) and uses Binary Phase Shift Keying (BPSK) modulation, that a code rate of the HE-SIGB fields is ½, that a 256 element Fast Fourier Transform (FFT) is performed. According to Equation 1, an aggregate HE-SIGB field bit rate is 65 Mbps, which is much lower than the maximum of 300 Mbps for the capacity of a single decoder of an IEEE Std 802.11n device that have been in the market for years.

$$\text{HE-SIGB Bit rate}=(N_B \cdot N_T)/I=(26 \cdot 32 \text{ bits})/12.8 \text{ µs}=65 \text{ Mbps} \qquad \text{Equation 1.}$$

Embodiments of the present disclosure such as described below may be used to decrease the burden of blind decoding the HE-SIGB fields.

Figure 5:
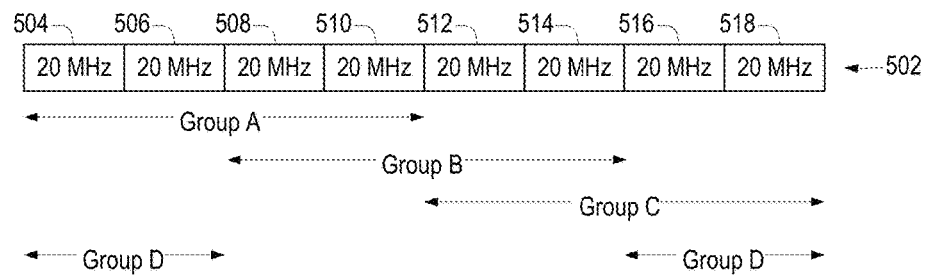
FIG. 5 illustrates an assignment of channels according to station groups, according to an embodiment.

FIG. 5 illustrates an assignment of channels according to station groups, according to an embodiment.

In an embodiment, information may be communicated to the stations receiving an OFDMA frame that indicates a restriction on where a station needs to search for HE-SIGB fields that include information for the station. The information may be Group Identification (Group ID) information. The information may be communicated in an HE-SIGA field.

The Group ID may be a Group ID used for MU-MIMO or for some other OFDMA operation, or may be a dedicated Group ID. Each station may be a member of one or more groups associated with respective Group IDs.

Information in an HE-SIGA field may indicate an association between groups and respective ranges of channels. Stations belonging to one group may decode only the HE-SIGB fields within the range of channels associated with that group. Stations belonging to a plurality of groups may decode only the HE-SIGB fields within the ranges of channels equal to a union of the respective ranges of channels of the plurality of groups.

FIG. 5 shows an example wherein a first group A is associated with first, second, third, and fourth 20 MHz channels 504, 506, 508, and 510 of a 160 MHz bandwidth OFDMA frame 502. Stations belonging to Group A may decode the HE-SIGB fields within the first, second, third, and fourth 20 MHz channels 504, 506, 508, and 510.

A second group B is associated with the third and fourth 20 MHz channels 508 and 510 and fifth and sixth 20 MHz channels 512 and 514 of the OFDMA frame 502. Stations belonging to Group B may decode the HE-SIGB fields within third and fourth 20 MHz channels 508 and S010 and the fifth and sixth 20 MHz channels 512 and 514.

A third group C is associated with the fifth and sixth 20 MHz channels 512 and 514 and seventh and eighth 20 MHz channels 516 and 518 of the OFDMA frame 502. Stations belonging to Group C may decode the HE-SIGB fields within the fifth and sixth 20 MHz channels 512 and 514 and the seventh and eighth 20 MHz channels 516 and 518.

A fourth group D is associated with the first and second 20 MHz channels 504 and 506 and the seventh and eighth 20 MHz channels 516 and 518 of the OFDMA frame 502. Stations belonging to Group D may decode the HE-SIGB fields within the first and second 20 MHz channels 504 and 506 and the seventh and eighth 20 MHz channels 516 and 518.

Figure 6:
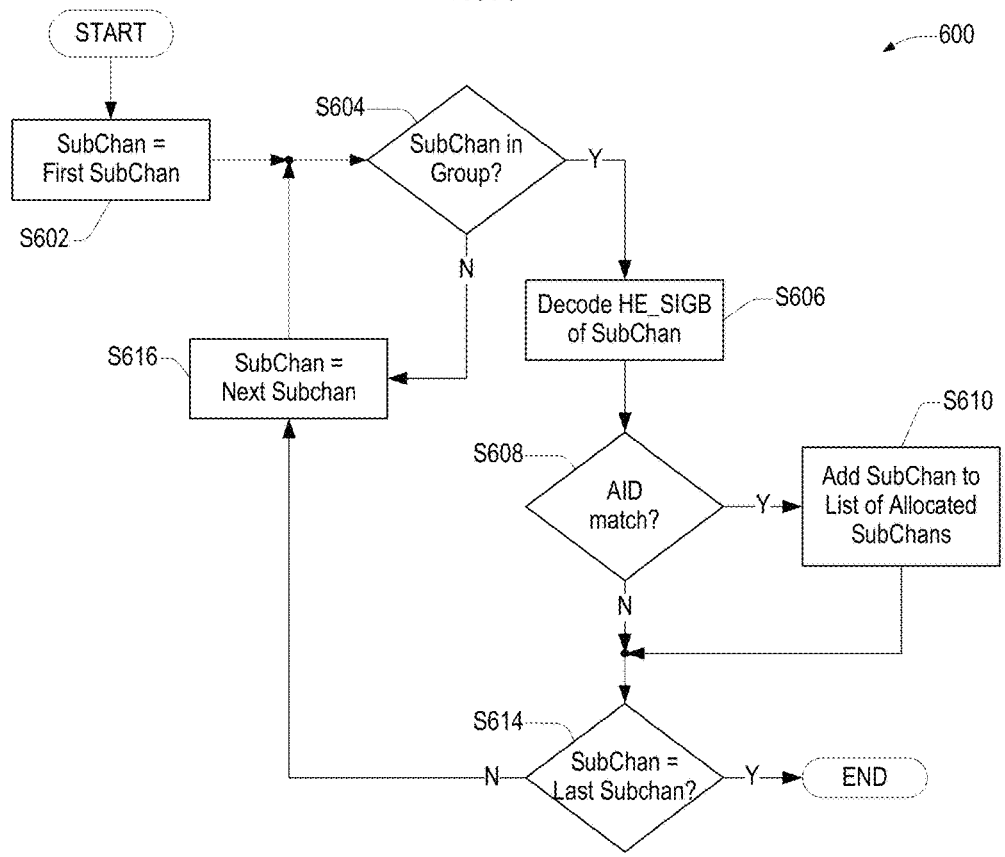
FIG. 6 is a flowchart of a process for decoding, using station groups, sub-channel allocation information included in an OFDMA frame, according to an embodiment.

FIG. 6 is a flowchart of a process 600 for decoding, using station groups, sub-channel allocation information included in an OFDMA frame, according to an embodiment. The process 600 may be performed by a receiving device, such as a station (STA) of a WLAN.

At S602, the process 600 initializes a sub-channel index SubChan to a first sub-channel of an OFDMA frame. The first sub-channel may be a sub-channel having a lowest frequency within the OFDMA frame, but embodiments are not limited thereto.

At S604, the process 600 determines whether a sub-channel indicated by the sub-channel index SubChan is within a group associated with the STA performing the process 600. When the sub-channel indicated by the sub-channel index SubChan is within the group, the process 600 proceeds to S606. When the sub-channel indicated by the sub-channel index SubChan is not within any group the STA is associated with, the process 600 proceeds to S616.

At S606, the process 600 decodes the HE-SIGB field of the sub-channel indicated by the sub-channel index SubChan.

At S608, the process 600 compares the AID field of the decoded HE-SIGB field to the AID of the STA. When the AID field of the HE-SIGB field corresponds to the AID of the STA, the process 600 proceeds to S610. Otherwise, the process 600 proceeds to S614.

At S610, the process 600 adds the sub-channel indicated by the sub-channel index SubChan to a list of sub-channels allocated to the STA.

At S614, the process 600 checks whether the sub-channel index SubChan is indicating the last sub-channel of the OFDMA frame. The last sub-channel may be a sub-channel having a highest frequency within the OFDMA frame, but embodiments are not limited thereto.

When the sub-channel index SubChan indicates the last sub-channel, the process 600 ends. Otherwise the process 600 proceeds to S616.

At S616, the sub-channel index SubChan is updated to refer to the next sub-channel of the OFDMA frame. The next sub-channel may be a sub-channel adjacent to and having a higher frequency than the current sub-channel indicated by the sub-channel index SubChan, but embodiments are not limited thereto. The process 600 then proceeds to S604.

Figures 7, 8, 9:
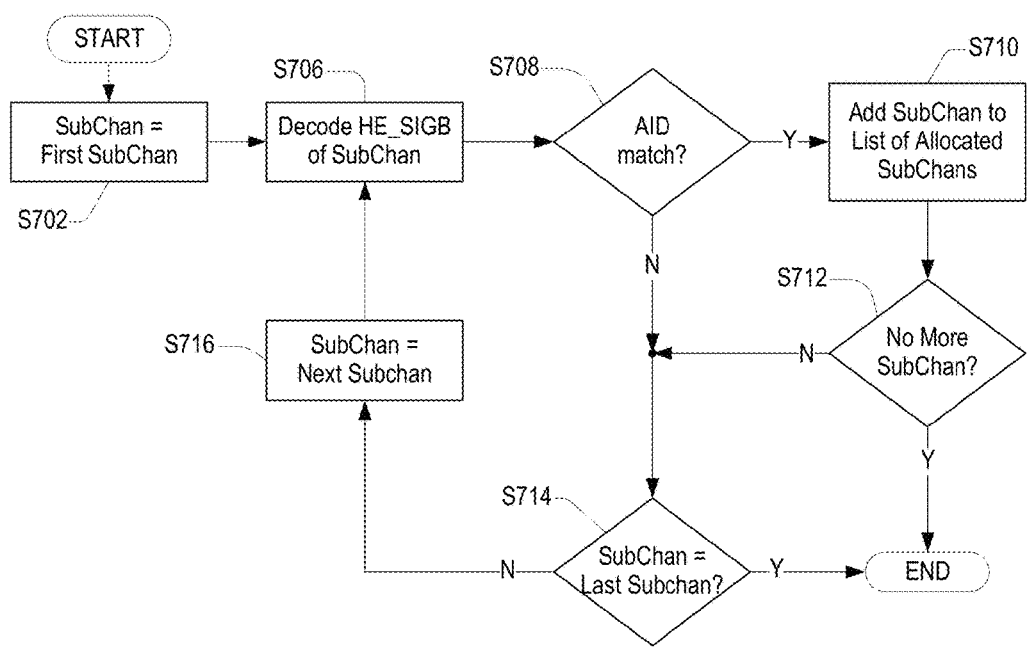
FIG. 7 is a flowchart of a process for decoding, using a stopping indication, sub-channel allocation information included in an OFDMA frame, according to an embodiment
FIG. 8 illustrates information in an HE-SIGB field, according to an embodiment.
FIG. 9 illustrates information in a compressed HE-SIGB field, according to an embodiment

FIG. 7 is a flowchart of a process 700 for decoding, using a stopping indication, sub-channel allocation information included in an OFDMA frame, according to an embodiment. The process 700 may be performed by a receiving device, such as a station of a WLAN.

The process 700 uses a stopping indicator included in an HE-SIGB field to reduce the number of blind-decoded HE-SIGB fields. The stopping indicator may be a NO-MORE-SUBCHANNEL field included in the HE-SIGB field. The device setting the NO-MORE-SUBCHANNEL field may do so using knowledge of the order in which a device receiving a frame that includes more than one HE-SIGB fields decodes the HE-SIGB fields.

At S702, the process 700 initializes a sub-channel index SubChan to a first sub-channel of an OFDMA frame. The first sub-channel may be a sub-channel having a lowest frequency within the OFDMA frame, but embodiments are not limited thereto.

At S706, the process 700 decodes the HE-SIGB field of the sub-channel indicated by the sub-channel index Sub-Chan.

At S708, the process 700 compares the AID field of the decoded HE-SIGB field to the AID of the STA performing the process 700. When the AID field of the HE-SIGB field corresponds to the AID of the STA, the process 700 proceeds to S710. Otherwise, the process 700 proceeds to S714.

At S710, the process 700 adds the sub-channel indicated by the sub-channel index SubChan to a list of sub-channels allocated to the STA. The process 700 proceeds to S712.

At S712, the process 700 determines whether the NO-MORE-SUBCHANNEL field of the HE-SIGB field decoded at S706 indicates that the sub-channel indicated by the sub-channel index SubChan is the last sub-channel allocated to the STA. In an embodiment, the NO-MORE-SUBCHAN-NEL field having a value of 1 indicates that the sub-channel indicated by the sub-channel index SubChan is the last sub-channel allocated to the STA, the process 700 ends. Otherwise, the process 700 proceeds to S714.

At S714, the process 700 checks whether the sub-channel index SubChan is indicating the last sub-channel of the OFDMA frame. The last sub-channel may be a sub-channel having a highest frequency within the OFDMA frame, but embodiments are not limited thereto.

When the sub-channel index SubChan indicates the last sub-channel, the process 700 ends. Otherwise the process 700 proceeds to S716.

At S716, the sub-channel index SubChan is updated to refer to the next sub-channel of the OFDMA frame. The next sub-channel may be a sub-channel adjacent to and having a higher frequency than the sub-channel indicated by the sub-channel index SubChan, but embodiments are not limited thereto. The process 700 then proceeds to S706.

The process 700 that uses the NO-MORE-SUBCHAN-NEL field to limit the number of HE-SIGB fields decoded by a STA may be combined with the process 600 that uses an association of one or more groups with the STA and an association of the groups with respective channels of the frame to limit the number of HE-SIGB fields decoded by a STA.

In another embodiment, HE-SIGB fields intended for a STA may include a value indicating the number of HE-SIGB fields that were intended to be decoded by the STA. The STA may determine to stop decoding HE-SIGB fields when a number of HE-SIGB fields decoded by the STA is equal to the value indicating the number of HE-SIGB fields that were intended to be decoded by the STA.

In an embodiment, the STA may determine that an error has occurred when the number of HE-SIGB fields decoded by the STA is less than the value indicating the number of HE-SIGB fields that were intended to be decoded by the STA and no HE-SIGB fields remain for the STA to decode.

In another embodiment, HE-SIGB fields intended for a STA may include one or more values indicating locations of other HE-SIGB fields that are intended to be decoded by the STA, which values may be used by the STA to determine whether any HE-SIGB fields remain that should be decoded and where (for example, at what frequencies) the remaining HE-SIGB field or fields that should be decoded are located.

FIG. 8 illustrates information in an HE-SIGB field in first to fourth cases 1 to 4, according to an embodiment. Within an HE-SIGB field, a reduction of the number of bits used to represent the information within the HE-SIGB field may increase an efficiency of the WLAN.

In each of Cases 1 to 4, the HE-SIGB field includes information beyond that shown in FIG. 8, which is represented by the n-bit "etc" field.

In each of Cases 1 to 4, the HE-SIGB field includes an STA identifier, such as an Association Identifier (AID) field or partial AID field. An AID is a unique number which is assigned to a station of a BSS when the station associates with the BSS.

The AID may have a value in the range 1-2007. The AID field having the value of the AID may include 11 or 16 bits within the HE-SIGB field.

The partial AID field may have a value in the range of 0 to 511 corresponding to a sum, module 512, of the 9 least significant bits of the AID of a station and a value derived from the BSS Identifier (BSSID). The partial AID field may include 9 bits within the HE-SIGB field.

A station uses the AID field or the partial AID field of the HE-SIGB field to determine whether the HE-SIGB field includes information for the station. For example, the station may use the AID or Partial AID field to determine that a sub-channel associated with the HE-SIGB field has been allocated to the station.

In each of Cases 1 to 4, the HE-SIGB field includes a Modulation and Coding Scheme (MCS) field represented in 4 bits of the HE-SIGB field. The MCS field indicates a data rate of information being sent to the station to which the HE-SIGB field applies.

In each of Cases 1 to 3, the HE-SIGB field includes a Cyclic Redundancy Code (CRC) field. The CRC field has a value equal to a checksum computed using a portion of the HE-SIGB field and may be used to detect errors in the HE-SIGB field.

In Case 1, the HE-SIGB field includes a 6-bit Tail field used to terminate a trellis when convolution coding is used.

In Case 2, the HE-SIGB field includes a 3-bit Number of Space-Time Streams (NsTs) field to indicate a number of space-time streams being used to transmit the frame that includes the HE-SIGB field when MIMO is used.

FIG. 9 illustrates information in a compressed HE-SIGB field 900, according to an embodiment. The compressed HE-SIGB field may be used to compress a HE-SIGB field including an AID or partial AID field and a CRC field, such as shown in Cases 1 to 3 of FIG. 8.

The compressed HE-SIGB field combines the CRC field with the STA identifier, such as the AID or partial AID field into a combined AID/CRC field 902 to reduce the number of bits used to represent the information in the HE-SIGB field.

In an embodiment, the combined AID/CRC field 902 is generated by combining an 11- or 16-bit AID field with a zero-extended CRC value using a bit-wise exclusive-or operation. For example, when the CRC value is an 8-bit value, bits 0 to 7 of the combined AID/CRC field 902 may be set equal to the exclusive-or of bits 0 to 7 of the 8-bit CRC value with bits 0 to 7 of the 11- or 16-bit AID field, respectively, and the remaining bits of the combined AID/CRC field 902 may be respectively set equal to the remaining bits (bit 8 and up) of the 11- or 16-bit AID field.

In an embodiment, the combined AID/CRC field 902 is generated by combining, using a bit-wise exclusive-or operation, a 9-bit partial AID field with the 8-bit CRC field. That is, bits 0 to 7 of the combined AID/CRC field 902 may be set equal to the exclusive-or of bits 0 to 7 of the 8-bit CRC value with bits 0 to 7 of the 9-bit AID field, respectively, and bit 8 of the combined AID/CRC field 902 may be set equal to bit 8 of the 9-bit AID field.

Figure 10A:
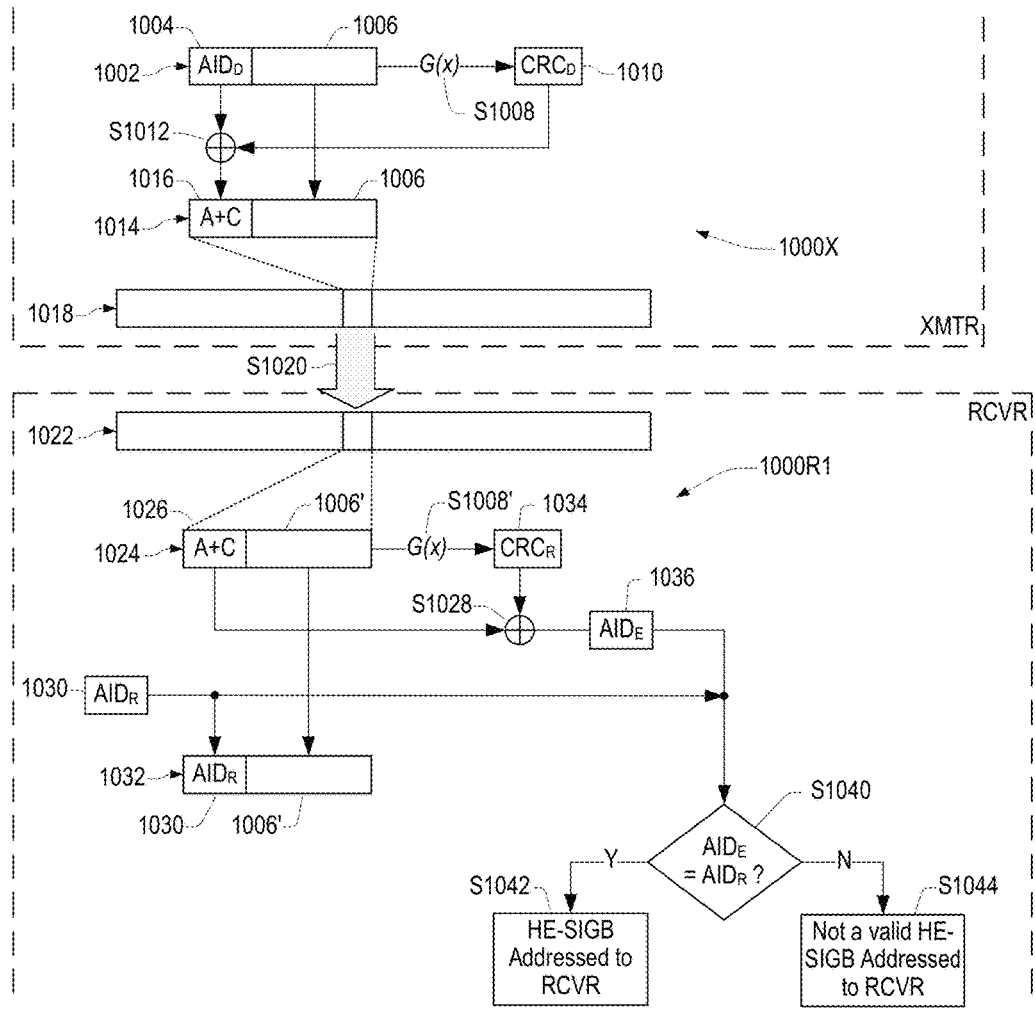
FIG. 10A illustrates a process for encoding a compressed HE-SIGB field and a process for decoding the compressed HE-SIGB field, according to an embodiment.

FIG. 10A illustrates a first process 1000X for encoding a compressed field and a second process 1000R1 for decoding the compressed field, according to an embodiment. In an embodiment, the compressed field is a compressed HE-SIGB field.

The first process 1000X may be performed by a transmitting device XMTR, such as a first station of a WLAN. The transmitting device XMTR may be an AP.

The second process 1000R1 may be performed by a receiving device RCVR, such as a second station of the WLAN.

A field 1002 includes a destination address field 1004 and a remaining portion 1006 of the field 1002. In an embodiment, the field 1002 is an HE-SIGB field and the address field 1004 may be an STA identifier, such as an Association Identifier (AID) field or a partial AID field.

At S1008, the process 1000X computes a checksum 1010 by applying a generator function $G(x)$ to the field 1002.

In an embodiment, the checksum 1010 is a Cyclic Redundancy Check (CRC) checksum and the generator function $G(x)$ includes a corresponding generator polynomial. In an embodiment, the generator function $G(X)$ corresponds to a one's complement of a remainder generated by a modulo 2 division of the bits in the field 1002 by a polynomial $x^8+x^2+x^1+1$.

At S1012, the process 1000X combines the destination address field 1004 and the checksum 1010 using a bit-wise exclusive-or operation to produce a combined address and checksum field (combined field) 1016.

The combined field 1016 is joined to the remaining portion 1006 to produce a compressed field 1014. Except for the substitution of the combined field 1016 for the address field 1004, the compressed field 1014 is otherwise identical to the field 1002.

In an embodiment wherein the field is an HE-SIGB field, the compressed field 1014 is a compressed HE-SIGB field.

The compressed field 1014 may be incorporated into a frame 1018, such as an OFDMA frame. Including the compressed field 1014 in the frame 1018 requires fewer bits than including both the field 1002 and the checksum 1010 would.

At S1020, the frame 1018 is transmitted from the transmitting device XMTR to a receiving device RCVR. The frame 1018 as received is a received frame 1022.

A received field 1024 may be extracted from the received frame 1022. The received field 1024 includes a combined field 1026 corresponding to the combined field 1016 of field 1014 and a received remaining portion 1006' corresponding to the remaining portion 1006 of the field 1014. The received remaining portion 1006' is identical to the remaining portion 1006' when no errors occur in the transmission performed in S1020.

At S1008', the process 1000R1 computes a checksum 1034 of the received field 1024 using the same generator function $G(x)$ that was used to generate the checksum 1010. In an embodiment where the checksum 1010 is a CRC checksum, the checksum 1034 of the received field 1024 is an estimated CRC checksum.

At S1028, the process 1000R1 combines the combined field 1026 with a checksum 1010 of the received field 1024 using a bit-wise exclusive-or operation to produces an estimated address 1036.

In an embodiment, the receiver address 1030 may be an STA identifier, such as an AID or a partial AID, and the estimated address 1036 may be an estimated STA identifier.

The process 1000R1 joins the receiver address 1030 and the received remaining portion 1006' to produce a reconstructed field 1032. That is, the processes 1000R1 substitutes the receiver address 1030 for the combined field 1026 of the received field 1024 to produce the reconstructed field 1032.

The reconstructed field 1032 is identical to the field 1002 when the destination address field 1004 has a value equal to the receiver address 1030 and no errors occur occurred in the relevant portion of the frame 1018 during the transmission in S1020.

At S1040, the process 1000R1 compares the estimated address 1036 to the receiver address 1030. The estimated address 1036 will be equal to the receiver address 1030 when (i) the destination address 1004 of the field 1002 is identical to the receiver address 1030 of the receiver RCVR, and (ii) no errors occurred in the relevant portion of the frame 1018 during the transmission of S1020.

The process 1000R1 proceeds to S1042 when the estimated address 1036 is equal to the receiver address 1030, and proceeds to S1044 otherwise.

At S1042, the process 1000R1 determines that the received field 1024 is addressed to the receiver RCVR when the estimated address 1036 is equal to the receiver address 1030.

At S1044, the process 1000R1 determines that the received field 1024 is not addressed to the receiver RCVR when the estimated address 1036 is not equal to the receiver address 1030. This can occur when either (i) the destination address 1004 was not the same as the receiver address 1020, (ii) an error was introduced in the received field 1024 during the transmission in S1020, or (iii) both (i) and (ii).

When the field 1002 is an HE-SIGB field, at S1042 the process 1000R1 determines that the reconstructed field 1032 is a valid HE-SIGB field including information intended for the receiver RCVR, and at S1044 the process 1000R1 determines that the reconstructed field 1032 is not a valid HE-SIGB field including information intended for the receiver RCVR.

FIG. 10B illustrates a process 1000R2, performed in a receiver RCVR', for decoding a compressed HE-SIGB field, according to another embodiment. Features of FIG. 10B that have the same reference character as respective features of FIG. 10A are substantially identical.

The process 1000R2 demonstrates an equivalent process for determining whether the destination address 1002 and the receiver address 1030 are identical and no errors occurred to the relevant portion of the frame 1018 during the transmission in S1020.

At S1038, the process 1000R2 combines the combined field 1026 with the receiver address 1030 using a bit-wise exclusive-or operation to produces an estimated checksum 1034.

At S1008", the process 1000R2 appends the estimate checksum 1034 to the reconstructed field 1032 to produce a reconstructed codeword 1048. The process 1000R then computes, using the same generator function G(x) used to compute the checksum 1010, a remainder 1046 of the codeword 1048.

At S1050, the process 1000R2 determines whether the remainder 1046 is equal to zero. The remainder 1046 being equal to zero indicates that the destination address 1004 has a value equal to the receiver address 1030 and that no errors occurred to the relevant portion of the frame 1018 during the transmission of S1020.

The process 1000R2 proceeds to S1052 when the remainder 1046 is equal to zero, and proceeds to S1054 otherwise.

At S1052, the process 1000R1 determines that the received field 1024 is addressed to the receiver RCVR'.

At S1054, the process 1000R1 determines that the received field 1024 is not addressed to the receiver RCVR'. This can occur when either (i) the destination address 1004 was not the same as the receiver address 1020, (ii) an error was introduced in the received field 1024 during the transmission of S1020, or (iii) both (i) and (ii).

When the field 1002 is an HE-SIGB field, at S1052 the process 1000R2 determines that the reconstructed field 1032 is an HE-SIGB field including information intended for the receiver RCVR', and at S1054 the process 1000R2 determines that the reconstructed field 1032 is not an HE-SIGB field including information intended for the receiver RCVR'.

In above explanations and figures, illustrative embodiments were provided to allow a person of skill in the art to understand and implement embodiments of the disclosure. However, embodiments are not limited thereto, and are therefore not limited to the number of STAs, specific identifications, specific formats, specific number of STAs per identifications, or other specifics of the illustrative embodiments. Furthermore, while in the description and related figures the reference has made to one or more IEEE Std 802.11 standards, embodiments are not limited thereto, and a person of skill in the art in light of the teachings and disclosures herein would understand how the present disclosures apply to any wireless operation that operates in licensed or unlicensed bands.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100 of FIG. 1, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method comprising:
   receiving, by a receiving device, a compressed field, the compressed field including a combined field and a remaining portion, the combined field having been generated by combining a destination address and a first checksum, the first checksum having been generated by applying a generator function to the destination address and the remaining portion, wherein the compressed field does not include the destination address;
   determining, using the combined field, an address of the receiving device, and the generator function, whether the compressed field is addressed to the receiving device, wherein determining whether the compressed field is addressed to the receiving device comprises:
   generating, by performing a bit-wise exclusive-or operation using the combined field and the address of the receiving device, an estimated checksum;
   generating a codeword including the address of the receiving device, the remaining portion, and the estimated checksum;
   generating, by applying the generator function to the codeword, a remainder; and
   comparing the remainder to zero.

2. The method of claim 1, wherein the generator function is a Cyclic Redundancy Check (CRC) generator function.

3. The method of claim 1, wherein the compressed field is a High Efficiency Signal B (HE-SIGB) field, and the HE-SIGB field includes information indicating a mapping of a sub-channel of a payload to the receiving device.

4. The method of claim 1, wherein the address of the receiving device is an Association Identifier (AID) or a partial AID corresponding to the receiving device in a wireless network.

5. An apparatus comprising a processor and a receiver,
   wherein the receiver is configured to receive a compressed field, the compressed field including a combined field and a remaining portion, the combined field having been generated by combining a destination address and a first checksum, the first checksum having been generated by applying a generator function to the destination address and the remaining portion, wherein the compressed field does not include the destination address; and
   wherein the processor is configured to determine, using the combined field, an address of the apparatus, and the generator function, whether the compressed field is addressed to the apparatus, wherein the processor is configured to determine whether the destination address corresponds to the address of the apparatus by:

generating, by performing a bit-wise exclusive-or operation using the combined field and the address of the apparatus, an estimated checksum;

generating a codeword including the address of the apparatus, the remaining portion, and the estimated checksum;

generating, by applying the generator function to the codeword, a remainder; and comparing the remainder to zero.

6. The apparatus of claim 5, wherein the generator function is a Cyclic Redundancy Check (CRC) generator function.

* * * * *